United States Patent
Choi et al.

(10) Patent No.: US 10,044,527 B2
(45) Date of Patent: Aug. 7, 2018

(54) APPARATUS, SYSTEM AND METHOD OF SIMULTANEOUS TRANSMIT AND RECEIVE (STR) WIRELESS COMMUNICATION

(71) Applicant: INTEL CORPORATION, Santa Clara, CA (US)

(72) Inventors: Yang-Seok Choi, Portland, OR (US); Shilpa Talwar, Cupertino, CA (US)

(73) Assignee: INTEL CORPORATION, Santa Clara, CA (US)

( * ) Notice: Subject to any disclaimer, the term of this patent is extended or adjusted under 35 U.S.C. 154(b) by 193 days.

(21) Appl. No.: 15/113,893

(22) PCT Filed: Feb. 25, 2014

(86) PCT No.: PCT/US2014/018135
§ 371 (c)(1),
(2) Date: Jul. 25, 2016

(87) PCT Pub. No.: WO2015/130257
PCT Pub. Date: Sep. 3, 2015

(65) Prior Publication Data
US 2016/0344574 A1  Nov. 24, 2016

(51) Int. Cl.
*H04B 3/23* (2006.01)
*H04L 25/03* (2006.01)
(Continued)

(52) U.S. Cl.
CPC ........ *H04L 25/03006* (2013.01); *H04B 3/232* (2013.01); *H04W 72/0406* (2013.01); *H04W 74/0816* (2013.01)

(58) Field of Classification Search
CPC .................. H04L 25/03006; H04M 9/082
See application file for complete search history.

(56) References Cited

U.S. PATENT DOCUMENTS

| 5,317,596 A | 5/1994 | Ho et al. |
| 5,636,272 A | 6/1997 | Rasmusson |

(Continued)

FOREIGN PATENT DOCUMENTS

| CN | 1856944 | 11/2006 |
| CN | 101083495 | 12/2007 |

(Continued)

OTHER PUBLICATIONS

European Search Report for European Patent Application No. 14883734.7, dated Aug. 4, 2017, 11 pages.

(Continued)

*Primary Examiner* — Shukri Taha
(74) *Attorney, Agent, or Firm* — Shichrur & Co.

(57) ABSTRACT

In some demonstrative embodiments, a simultaneous transmit and receive (STR) transceiver may include a receiver; a transmitter; a Radio Frequency (RF) echo cancellation module to generate an analog echo cancellation signal to be applied to a received RF signal via the receiver based on a transmitted RF signal via the transmitter; and a digital baseband module. The RF echo cancellation module may include a plurality of tap modulators to modulate a plurality of delayed taps of the transmitted RF signal. A tap modulator may include a plurality of phase shifters to generate a plurality of phase-shifted signals by applying a plurality of phase shifts to a delayed tap; and a plurality of multipliers to multiply the plurality of phase-shifted signals with a respective plurality of weights. The digital baseband module may determine the plurality of weights based on a plurality of subcarriers of a digital frequency-domain signal corresponding to the transmitted RF signal.

24 Claims, 4 Drawing Sheets

(51) Int. Cl.
*H04W 72/04* (2009.01)
*H04W 74/08* (2009.01)

(56) References Cited

U.S. PATENT DOCUMENTS

| | | | |
|---|---|---|---|
| 6,278,785 B1 * | 8/2001 | Thomasson | H04B 3/23 |
| | | | 379/406.15 |
| 6,963,643 B1 | 11/2005 | Lilliott | |
| 7,916,671 B1 | 3/2011 | Zortea et al. | |
| 8,019,028 B1 | 9/2011 | Zortea et al. | |
| 8,055,235 B1 | 11/2011 | Gupta et al. | |
| 8,135,339 B2 | 3/2012 | Ranson et al. | |
| 8,170,470 B2 | 5/2012 | Park et al. | |
| 8,280,037 B2 | 10/2012 | Takada | |
| 9,237,515 B2 * | 1/2016 | Wang | H04B 1/71072 |
| 9,282,564 B2 | 3/2016 | Choi | |
| 9,537,543 B2 | 1/2017 | Choi | |
| 2004/0114542 A1 | 6/2004 | Stopler | |
| 2004/0190637 A1 | 9/2004 | Maltsev et al. | |
| 2005/0069063 A1 | 3/2005 | Waltho et al. | |
| 2005/0099967 A1 | 5/2005 | Baba | |
| 2005/0163249 A1 | 7/2005 | McCallister | |
| 2006/0146738 A1 | 7/2006 | Lu | |
| 2006/0267734 A1 | 11/2006 | Taki et al. | |
| 2007/0194886 A1 | 8/2007 | Bang et al. | |
| 2008/0198911 A1 | 8/2008 | Hui et al. | |
| 2008/0232268 A1 | 9/2008 | Kahrizi et al. | |
| 2009/0130981 A1 | 5/2009 | Nagai et al. | |
| 2010/0197232 A1 | 8/2010 | Piket et al. | |
| 2010/0226492 A1 | 9/2010 | Takada | |
| 2011/0019831 A1 * | 1/2011 | Liu | H04M 9/082 |
| | | | 381/66 |
| 2011/0134810 A1 | 6/2011 | Yamamoto et al. | |
| 2011/0176688 A1 | 7/2011 | Sugiyama | |
| 2012/0252382 A1 | 10/2012 | Bashir et al. | |
| 2012/0269102 A1 | 10/2012 | Nicholls et al. | |
| 2013/0040555 A1 | 2/2013 | Rimini et al. | |
| 2013/0102254 A1 | 4/2013 | Cyzs et al. | |
| 2013/0322638 A1 | 12/2013 | Lee et al. | |
| 2014/0376416 A1 | 12/2014 | Choi | |

FOREIGN PATENT DOCUMENTS

| | | |
|---|---|---|
| CN | 101785212 | 7/2010 |
| CN | 102025395 | 4/2011 |
| CN | 102165709 | 8/2011 |
| CN | 102282782 | 12/2011 |
| JP | 2005253058 | 9/2005 |
| JP | 2007281592 | 10/2007 |
| JP | 2010022009 | 1/2010 |
| JP | 2011120120 | 6/2011 |
| KR | 1020110025667 | 3/2011 |
| WO | 2005008916 | 1/2005 |
| WO | 2010077545 | 7/2010 |
| WO | 2013095386 | 6/2013 |

OTHER PUBLICATIONS

International Preliminary Report on Patentability received for International Patent Application No. PCT/US2013/060445 dated Jun. 9, 2015, 5 pages.
International Search Report and Written Opinion received for Patent Application No. PCT/US2013/060445, dated Feb. 7, 2014, 9 pages.
Office Action for U.S. Appl. No. 14/128,278, dated Jul. 14, 2015, 13 pages.
Yang-Seok Choi et al., "Simultaneous Transmission and Reception: Algorithm, Design and System Level Performance", IEEE Transactions on Wireless Communications, Accepted for Publication (This article has been accepted for inclusion in a future issue of this journal. Content is final as presented, with the exception of pagination.) IEEE 2013, 19 pages.
Notice of Allowance for U.S. Appl. No. 14/128,278, dated Nov. 10, 2015, 12 pages.
Office Action for Chinese Patent Application Serial No. 201180075745.9, dated Mar. 15, 2016, 5 pages.
Extended European Search Report received for European Patent Application No. 11878164.0, dated Jul. 17, 2015, 6 pages.
Office Action received for Japanese Patent Application No. 2014-548752, dated Apr. 21, 2015, 9 pages (including 5 pages English translation).
International Search Report and Written Opinion, dated May 22, 2012, Application No. PCT/US2011/066181, Filed Date: Dec. 20, 2011, 9 pages.
Office Action received for Chinese Patent Application No. 201180075745.9, dated Jan. 4, 2015, 25 pages. (Including 15 pages English translation).
Office Action for U.S. Appl. No. 13/976,423, dated Dec. 17, 2015, 35 pages.
Notice of Allowance for U.S. Appl. No. 13/976,423, dated Aug. 25, 2016, 22 pages.
International Preliminary Report on Patentability for PCT/US2014/018135, dated Sep. 9, 2016, 9 pages.
International Search Report and Written Opinion for PCT/US2014/018135, dated Nov. 18, 2014, 10 pages.
IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
Office Action for U.S. Appl. No. 13/976,423, dated May 27, 2016, 27 pages.
Office Action for Taiwanese Patent Application No. 104101796, dated Jan. 14, 2016, 8 pages (Including 1 page of English translation).
Office Action for Taiwanese Patent Application No. 104101796, dated Jun. 4, 2016, 2 pages.
Office Action for Taiwanese Patent Application No. 104101796, dated Dec. 16, 2016, 7 pages (Including 1 page of English translation).

* cited by examiner

APPARATUS, SYSTEM AND METHOD OF SIMULTANEOUS TRANSMIT AND RECEIVE (STR) WIRELESS COMMUNICATION

TECHNICAL FIELD

Embodiments described herein generally relate to simultaneous transmit and receive (STR) wireless communication.

BACKGROUND

Wireless communication devices employing separate time and/or frequency resources for downlink (DL) and uplink (UL) communication may not be able to exploit the full time and/or frequency capacity for conduction of wireless communications.

A simultaneous transmission (Tx) and reception (Rx) (STR) transceiver may be configured to enable duplex communication including transmission and reception over the same frequency and time range. The STR transceiver may include a transmitter and a receiver coupled to one or more antennas via a duplexer, which may duplex between a transmit path of the transmitter and a receive path of the receiver.

However, when Tx and Rx signals use the same Radio Frequency (RF) carrier and time slot, a high-power Tx signal may leak to the receive chain through the duplexer as an "echo". The term "echo" may refer to an undesired feed-through of a transmitted data signal into a receiver.

As one example, a Tx signal may be transmitted at 46 Decibel to milliWatt (dBm), and a duplexer leakage of 40 Decibel (dB) leakage may result in an echo of 6 dBm.

In many circumstances, the Rx signal may be weak compared to the echo. Accordingly, the echo may create a severe interference to the Rx signal, which may not enable the receiver to decode the Rx signal.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
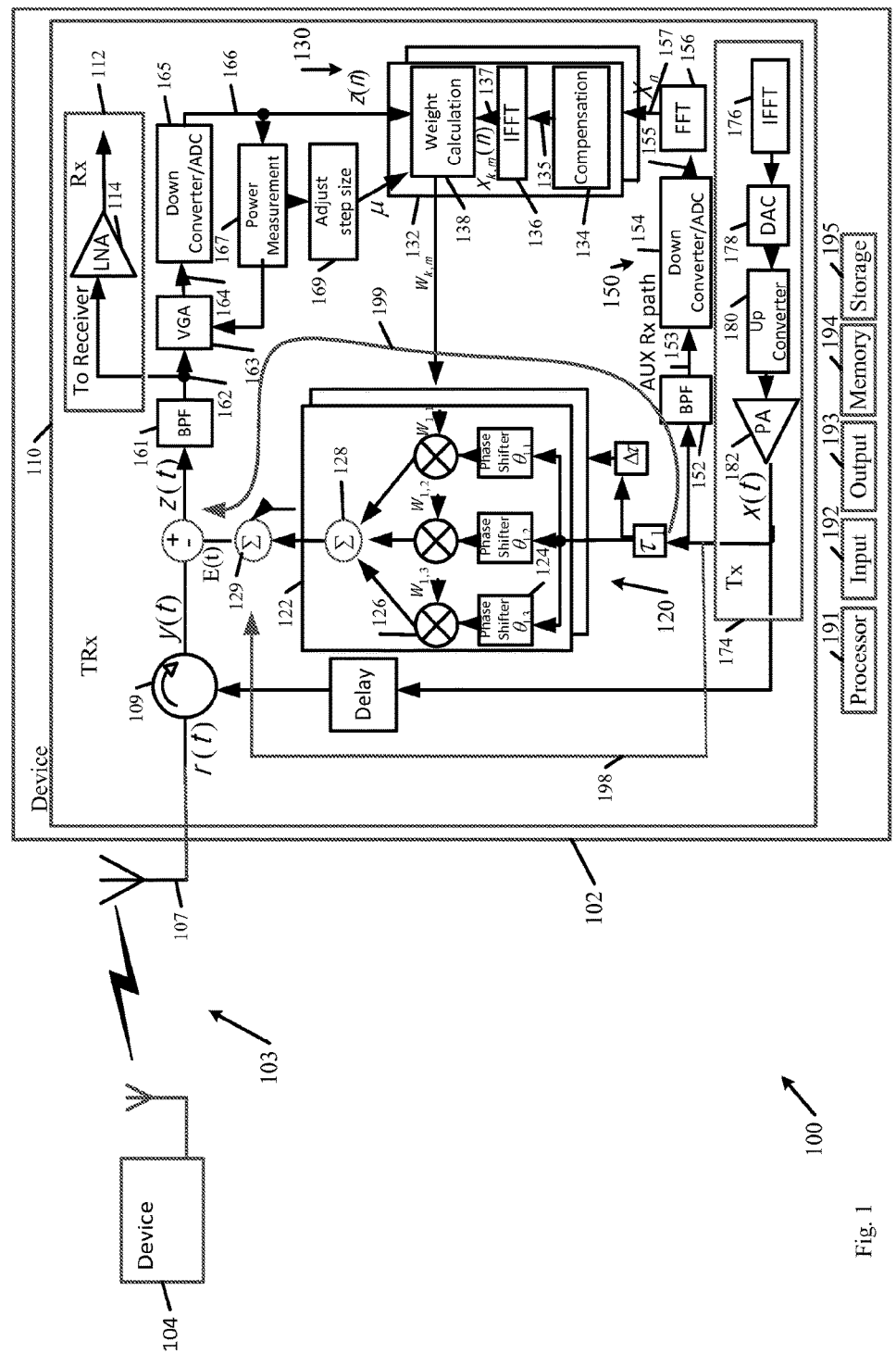
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, an Ultrabook™ computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AN) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11 task group ac (TGac) ("IEEE802.11-09/0308r12—TGac Channel Model Addendum Document"); IEEE 802.11 task group ad (TGad) (IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof, devices and/or networks operating in accordance with existing WirelessHD™ specifications, and/or future versions and/or derivatives thereof, devices and/or networks operating in accordance with existing and/or Wireless Fidelity (WiFi) Alliance (WFA) Peer-to-Peer (P2P) specifications (WiFi P2P technical specification version 1.2, 20122 and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some demonstrative embodiments.

In some demonstrative embodiments, system 100 may include a wireless communication network including one or more wireless communication devices, e.g., wireless communication device 102 and one or more wireless communication devices 104, capable of communicating content, data, information and/or signals over a wireless communication medium 103, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102 and/or 104 may include, for example, a PC, a desktop computer, a mobile computer, a laptop computer, an Ultrabook™ computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, wireless communication devices 102 and 104 may form or communicate as part of a wireless local area network (WLAN).

In some demonstrative embodiments, wireless communication devices 102 and 104 may form or communicate as part of a WiFi network.

In some demonstrative embodiments, wireless communication devices 102 and 104 may form or communicate as part of a Point-to-Point (P2P) network.

In some demonstrative embodiments, wireless communication devices 102 and 104 may form or communicate as part of a cellular network, e.g., an LTE network.

In other demonstrative embodiments, wireless communication devices 102 and 104 may form or communicate as part of any other wireless communication network.

In some demonstrative embodiments, wireless communication device 102 may include a transceiver (TRX) 110 to perform wireless communication between wireless communication device 102 and one or more wireless communication devices 104

In some demonstrative embodiments, transceiver 110 may be configured to perform simultaneous transmission and reception (STR) of wireless communication signals, e.g., as described below.

In some demonstrative embodiments, transceiver 110 may include, or may be associated with, one or more antennas 107. Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. Antennas 107 may include, for example, antennas suitable for directional communication. For example, antennas 107 may include a phased array antenna, a single element antenna, a set of switched beam antennas, and/or the like. In some embodiments, antennas 107 may implement transmit and receive functionalities using shared and/or integrated transmit/receive elements.

In some demonstrative embodiments, wireless communication device 102 may also include, for example, one or more of a processor 191, an input unit 192, an output unit 193, a memory unit 194, and a storage unit 195. Wireless communication device 102 may optionally include other suitable hardware components and/or software components. In some demonstrative embodiments, some or all of the components of one or more of wireless communication device 102 may be enclosed in a common housing or packaging, and may be interconnected or operably associated using one or more wired or wireless links. In other embodiments, components of one or more of wireless communication device 102 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of wireless communication device 102 and/or of one or more suitable applications.

Input unit 192 includes, for example, a keyboard, a keypad, a mouse, a touch-screen, a touch-pad, a track-ball, a stylus, a microphone or, other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by wireless communication device 102.

In some demonstrative embodiments, transceiver 110 may implement simultaneous transmission and reception of signals over the same RF carriers of the same frequency range.

In some demonstrative embodiments, transceiver 110 may include a receiver (Rx) 112 and a transmitter (Tx) 174 coupled to one or more antennas 107 via a duplexer 109.

In some demonstrative embodiments, receiver 112 may include a Low Noise Amplifier (LNA) 114 to process an incoming signal (the "received signal) received via one or more antennas 107. In some demonstrative embodiments, receiver 112 may be configured to perform any additional processing of the received signal, for example, demodulation, decoding and the like.

In some demonstrative embodiments, transmitter 174 may transmit a signal ("the transmitted signal") via one or more antennas 107.

In some demonstrative embodiments, transmitter 174 may be configured to generate an RF transmitted signal, denoted x(t), based on a digital baseband signal, denoted X(n).

For example, transmitter 174 may include a frequency-domain to time-domain transformer, e.g., an Inverse Fast Fourier transform (IFFT) module 176, to transform the digital baseband signal X(n) from a frequency-domain into a time-domain. Transmitter 174 may also include a digital to analog converter (DAC) 178 to convert the time-domain digital signal into an analog signal, an upconverter 180 to convert the analog signal into the RF signal x(t) at a given RF frequency, e.g., a passband signal, and a Power Amplifier (PA) 182 to amplify the RF signal to be transmitted via antenna 107.

In some demonstrative embodiments, transceiver 110 may include a RF echo cancellation module 120 to generate an analog echo cancellation signal, denoted E(t), to be applied to the received RF signal via receiver 112, denoted y(t), based on the transmitted RF signal via transmitter 174, e.g., as described below.

In some demonstrative embodiments, the RF signal x(t) may be expressed as:

$$x(t)=x_i(t)\cos(\omega t)+x_q(t)\sin(\omega t) \quad (1)$$

wherein $\omega$ denotes a carrier frequency in radian/sec, $x_i(t)$ denotes an in-phase baseband signal and $x_q(t)$ denotes a quadrature-phase baseband signal.

In some demonstrative embodiments, the received signal y(t) including a combination of a desired received signal and an echo, may be expressed as:

$$y(t) = gx(t-T) + r(t) + n(t) \quad (2)$$

wherein r(t) denotes the desired received signal, n(t) denotes noise, e.g., an additive Gaussian white noise (AGWN), g denotes an unknown echo gain via an echo path 198, and r denotes an unknown echo delay.

In some demonstrative embodiments, RF echo cancellation module 120 may be configured to estimate the echo of echo path 198 using multiple replica of the signal x(t) with a plurality of different delays, e.g., as described below.

In some demonstrative embodiments, RF echo cancellation module 120 may be configured to estimate the echo utilizing a plurality of delayed taps, e.g., including K>1 delayed taps, of the RF transmitted signal x(t). In some embodiments, RF echo cancellation module 120 may be configured to estimate the echo utilizing three or more delayed taps. In other embodiments, RF echo cancellation module 120 may be configured to estimate the echo utilizing only two delayed taps.

In some demonstrative embodiments, a k-th delayed tap, wherein k=1 ... K, may be generated by applying a tap delay, denoted $\tau_k$, to the RF transmitted signal x(t).

In some demonstrative embodiments, the K tap delays $\tau_k$ may include fixed delays, e.g., as described below. In other embodiments, one or more of the tap delays may be variable.

In some demonstrative embodiments, the K tap delays may be set to include tap delays separated by a predefined delay difference, denoted $\Delta\tau$, e.g., as follows:

$$\tau_k = \tau_1 + (k-1) * \Delta\tau \quad (3)$$

wherein $\tau_1$ denotes an initial tap delay.

In some demonstrative embodiments, the Tap delay $\tau_1$ may be set to be greater the delay difference $\Delta\tau$. In some demonstrative embodiments, the K tap delays $\tau_k$ may be set, for example, such that a true delay of the echo may be between the tap delay $\tau_1$ and the tap delay $\tau_k$.

In some demonstrative embodiments, the delay difference $\Delta\tau$ may be implemented using a short transmission line, for example, if the tap delay $\tau_1$ is relatively small. However, in some cases the transmission line may be too long to implement for a small form factor device. In such cases, for example, the tap delay $\tau_1$ may be realized by an all pass filter or a band pass filter.

In some demonstrative embodiments, the tap delay $\tau_1$ may be realized by a phase shifter, e.g., as described below, for example, if the phase shifter has a delay comparable to the tap delay $\tau_1$.

In other embodiments, the tap delay $\tau_1$ may be implemented in any other manner.

In other embodiments, the K tap delays may be configured to provide any other plurality of delays.

In some demonstrative embodiments, RF echo cancellation module 120 may include a plurality of tap modulators 122 to modulate the plurality of delayed taps. For example, RF echo cancellation module 120 may include K tap modulators 122 to modulate the K delayed taps with the K tap delays $\tau_k$, respectively.

In some demonstrative embodiments, a k-th tap modulator 122 corresponding to a respective k-th delayed tap may include a plurality of phase shifters 124 to generate a plurality of phase-shifted signals by applying a plurality of phase shifts to the k-th delayed tap, e.g., as described below.

In some demonstrative embodiments, the plurality of phase shifters 124 of the k-th delay tap modulator 122 may include M phase-shifters to apply M>1 phase shifts, denoted, $\theta_{k,m}$, wherein m=1 ... M.

For example, as shown in FIG. 1, the tap modulator 122 corresponding to the delayed tap $\tau_1$ may include three phase shifters 124 to apply to the delayed tap $\tau_1$ three phase shifts, denoted $\theta_{1,1}$, $\theta_{1,2}$, and $\theta_{1,3}$.

In some demonstrative embodiments, phase shifters 124 may be configured to apply a plurality of fixed phase shifts. In one example, the phase shifters of each tap modulator 122 may be configured to apply the following fixed phase shifts to m respective replicas of the k-th delayed tap:

$$\theta_{k,m} = \frac{\pi}{M} m \quad (4)$$

In one example, each tap modulator 122 may include three phase shifters to provide phase shifts of 60, 120 and 180 degrees.

In other embodiments, tap modulators 122 may include any other number of phase shifters to apply any other number and/or values of phase shifts.

In some demonstrative embodiments, tap modulators 122 may be configured to generate a weighted combination of the phase-shifted signals, e.g., as described below.

In some demonstrative embodiments, the k-th tap modulator 122 may include a plurality of multipliers 126 to multiply the plurality of phase-shifted signals with a respective plurality of weights, denoted $w_{k,m}$. In one example, RF echo cancellation module 120 may be configured, for example, such that the weights $w_{k,m}$ are each less than 1. According to this example, a multiplier of multipliers 126 may be implemented by variable attenuator. In other embodiments, RF echo cancellation module 120 may be configured with respect to any other weights $w_{k,m}$ and/or multipliers 126 may be implemented in any other manner.

For example, as shown in FIG. 1, the tap modulator 122 corresponding to the tap delay $\tau_1$ may include three multipliers 126 to multiply the outputs of the phase-shifters $\theta_{1,1}$, $\theta_{1,2}$, and $\theta_{1,3}$ with three respective weights, denoted $w_{1,1}$, $w_{1,2}$, and $w_{1,3}$.

In some demonstrative embodiments, the k-th tap modulator 122 may include a summer 128 to sum the outputs of the plurality of multipliers 126 of the k-th tap modulator 122.

In some demonstrative embodiments, RF echo cancellation module 120 may generate the echo cancellation signal E(t) based on a sum of the outputs of the K tap modulators 122. For example, RF echo cancellation module 120 may include a summer 129 to sum the outputs of the multipliers 128 of the K tap modulators 122.

In some demonstrative embodiments, an estimated echo output signal, denoted $x_{k,m}(t)$, of the m-th phase shifter 124 at the k-th tap modulator 122 may be determined, for example, as follows:

$$x_{k,m}(t) = g_{k,m}\{x_i(t-\tau_k)\cos(\omega(t-\tau_k)-\theta_{k,m}) + x_q(t-\tau_k)\sin(\omega(t-\tau_k)-\theta_{k,m})\} \quad (5)$$

wherein $g_{k,m}$ denotes a gain of the m-th phase shifter 124 at the k-th tap modulator 122.

In some demonstrative embodiments, Equation 5 may be rewritten as follows, for example, to represent a complex baseband signal:

$$X_{k,m}(t) = X_{k,m,i}(t) + jX_{k,m,q}(t) \quad (6)$$

wherein:

$$X_{k,m,i}(t) = g_{k,m}\{x_i(t-\tau_k)\cos(\omega\tau_k + \theta_{k,m}) - x_q(t-\tau_k)\sin(\omega\tau_k + \theta_{k,m})\} \quad (7)$$

and:

$$X_{k,m,q}(t) = g_{k,m}\{x_i(t-\tau_k)\sin(\omega\tau_k+\theta_{k,m}) + x_q(t-\tau_k)\cos(\omega\tau_k+\theta_{k,m})\} \quad (8)$$

In some demonstrative embodiments, the echo cancellation signal E(t) at the output of summer 129 may be determined, for example, as follows:

$$E(t) = \sum_k \sum_m w_{k,m} X_{k,m}(t) \quad (9)$$

In some demonstrative embodiments, an echo-canceled signal, denoted Z(t), resulting from applying the echo cancellation signal E(t) to the received signal Y(t), may be determined, for example, as follows:

$$Z(t) = Y(t) - E(t) \quad (10)$$

In some demonstrative embodiments, the weights $w_{k,m}$ may be determined based on a minimization of cost function corresponding to the echo-canceled signal Z(t).

For example, the weights $w_{k,m}$ may be determined based on a minimization of a cost function, denoted C, e.g., as follows:

$$C = E\{|Z(t)|^2\} \quad (11)$$

In other embodiments, any other cost function may be used, and/or the weights $w_{k,m}$ may be determined by applying any other criteria to the cost function.

In some demonstrative embodiments, the cost function C may be minimized using a Least Means Squared (LMS) technique, or any other technique.

In one example, the weights $w_{k,m}$ may be adaptively adjusted by applying a steepest-descent optimization algorithm to the cost function C, e.g., as follows:

$$w_{k,m} = w_{k,m} - \frac{\mu}{2}\left(Z(t)\frac{\partial Z^*(t)}{\partial w_{k,m}} + Z^*(t)\frac{\partial Z(t)}{\partial w_{k,m}}\right) \quad (12)$$

wherein the notation (•)* denotes a complex conjugate operation, and wherein μ denotes a step size for updating the weights $w_{k,m}$.

In some demonstrative embodiments, Equation 12 may be rewritten as follows:

$$w_{k,m} = w_{k,m} + \mu Re\{X^*_{k,m}(t)Z(t)\} \quad (13)$$

Determining the weights $w_{k,m}$ at RF echo cancellation module 120 based on Equation 13 may require down-converting the outputs of phase shifters 124 into the in-phase and quadrature-phase components.

Accordingly, determining the weights $w_{k,m}$ at RF echo cancellation module 120 may require using a plurality of down converters, e.g., M*K down-converters, at RF echo cancellation module 120. Such an implementation of M*K down-converters at RF echo cancellation module 120 may be complex, expensive and/or power consuming.

In some demonstrative embodiments, transceiver 110 may be configured to determine the weights $w_{k,m}$ at a baseband domain of transceiver 110.

In some demonstrative embodiments, transceiver 110 may be configured to determine the weights $w_{k,m}$ based on a digital baseband frequency-domain signal, e.g., as described below.

In some demonstrative embodiments, transceiver 110 may include a digital baseband module 130 to determine the weights $w_{k,m}$ based on a plurality of subcarriers of a digital frequency-domain signal, denoted $X_n$, corresponding to the transmitted signal X(n), e.g., as described below.

In some demonstrative embodiments, transceiver 110 may include a receive path ("Auxiliary receive (Rx) path") 150 to downconvert the signal x(t) into the digital baseband signal Xn in the frequency domain.

In some demonstrative embodiments, auxiliary Rx path 150 may include a band pass filter 152 to filter the signal x(t) into a filtered signal 153, and a converter 154, e.g., including a down converter and analog to digital converter (ADC), to downconvert the filtered signal 154 into a digital baseband time-domain signal 155.

In some demonstrative embodiments, auxiliary Rx path 150 may also include a time-domain to frequency-domain transformer 156, e.g., a Fast Fourier Transform (FFT) module, to transform digital time-domain signal 155 into a digital frequency-domain signal 157 including the signal Xn.

In some demonstrative embodiments, digital baseband module 130 may be configured to compensate sub-carriers of the frequency domain signal Xn to account for phase rotations introduced to the signal x(t) by phase-shifters 124, and tap delays $\tau_k$ applied to signal x(t) by the K delay taps.

In some demonstrative embodiments, digital baseband module 130 may include a plurality of baseband processing modules 132 to process the sub-carriers of the frequency domain signal Xn based on K tap delays $\tau_k$ and the M phase shifts applied by tap modulators 122.

In some demonstrative embodiments, digital baseband module 130 may include K*M baseband processing modules 132. For example, a baseband processing module 132 may be configured to calculate the weight $w_{k,m}$ to be applied to the output of the m-th phase-shifter 124 of the k-th tap modulator 122, e.g., as described below.

In some demonstrative embodiments, the baseband processing module 132 may include a compensator 134 to generate a plurality of compensated sub-carrier signals 135 corresponding to the m-th phase shifter of the k-th delayed tap.

In some demonstrative embodiments, compensator 134 may generate compensated sub-carrier signals 135 based on the phase shift $\theta_{k,m}$ and the tap delay $\tau_k$.

In one example, compensator 134 may generate compensated sub-carrier signals 135, denoted Xn', by applying a compensation function to the signal Xn, e.g., as follows:

$$X_n' = X_n e^{-j(2\pi n\Delta f \tau_k + \theta_{k,m})} \quad (14)$$

wherein Δf denotes a subcarrier spacing of the FFT.

In some demonstrative embodiments, the baseband processing module 132 may include a frequency-domain to time-domain transformer 136, e.g., an IFFT module, to transform the plurality of compensated sub-carrier signals 135 into a plurality of compensated time-domain signals 137, denoted $x_{k,m}(n)$.

In one example, the compensated time-domain signals $x_{k,m}(n)$ may be expressed, for example, as follows:

$$x_{k,m}(n) = \text{IFFT}(X_n e^{-j(2\pi n\Delta f \tau_k + \theta_{k,m})}) \quad (15)$$

In some demonstrative embodiments, compensated time-domain signals 137 may include baseband signals having a phase rotation of $\theta_{k,m}$ and a delay $\tau_k$.

In some demonstrative embodiments, the baseband processing module 132 may include a weight calculator 138 to determine the weight $w_{k,m}$ based on the compensated time-domain signals 137.

In some demonstrative embodiments, weight calculator 138 may determine the weight $w_{k,m}$ based on the compensated time-domain signals 137 and the received RF signal, e.g., as described below.

In some demonstrative embodiments, transceiver 110 may include a BPF 161 to filter the echo cancelled signal Z(t) into a filtered signal 162 to be provided to receiver 112. Transceiver 110 may also include a variable gain amplifier 163 to amplify filtered signal into an amplified signal 164, and a converter 165, e.g., including a downconverter and ADC, to downconvert signal 164 into a digital baseband signal 166, denoted z(n).

In some demonstrative embodiments, BPF 152 may be configured based on a configuration of BPF 161; and/or converter 154 may be configured based on a configuration of converter 165. In one example, BPF 152 may have similar characteristics as BPF 161, and/or converter 154 may have similar characteristics as converter 165.

In some demonstrative embodiments, weight calculator 138 may determine the weight $w_{k,m}$ based on a modified version of Equation 13, for example, taking into consideration the transformations between the time and frequency domains, e.g., using the FFT and IFFT operations.

In one example, weight calculator 138 may determine the weight $w_{k,m}$ e.g., as follows:

$$w_{k,m} = w_{k,m} + \mu \sum_n Re\{x_{k,m}^*(n)z(n)\} \quad (16)$$

In some demonstrative embodiments, the summation of Equation 16 may be performed over the FFT size, e.g., over n=1 . . . FFT-size. Accordingly, the weight $w_{k,m}$ may be updated according to Equation 16 at every symbol, e.g., every OFDM symbol, for example, instead of updating the weight every sample, e.g., if Equation 13 is used.

In some demonstrative embodiments, the gain of VGA 163 may be controlled based on a power of signal 166. For example, transceiver 110 may include a power measurement module 167 to measure the power of signal 166 and to control VGA 163 based on the measured power of signal 166.

In some demonstrative embodiments, the gain of VGA 163 may increase, for example, in response to a decrease in the echo power.

In some demonstrative embodiments, transceiver 110 may include an adjuster 169 to adjust the step size μ based on the measured power of the signal 166. For example, adjuster 169 may be configured to decrease the step-size μ, e.g., in response to an increase in the gain of VGA 163. Adjuster 169 may be configured to adjust the step-size μ according to an adjustment algorithm and/or function, which may be determined, for example, empirically, e.g., with respect to a specific configuration of one or more elements of transceiver 110, for example, an automatic gain control element and/or any other element.

In some demonstrative embodiments, compensator 134 may be configured to generate the plurality of compensated sub-carrier signals 135 based on a frequency response of a path ("the echo estimation path") 199 including a receiver path of transceiver 110 ("the main Rx path"), and a path of the m-th phase shifter 124 in the k-th tap modulator 122.

In some demonstrative embodiments, compensator 134 may generate compensated sub-carrier signals Xn', by applying to the signal Xn a compensation function, denoted $G_n(k,m)$, e.g., as follows:

$$X_n' = X_n G_n(k,m) \quad (17)$$

In some demonstrative embodiments, the compensation function $G_n(k,m)$ may include a frequency response of the path of the k-th tap and the m-th phase shifter including the receiver path transceiver 110 at the n-th subcarrier. For example, the function $G_n(k,m)$ may be determined by measuring the frequency response of each combination of the K taps and M phase shifters with the main Rx path at the n-th subcarrier.

In some demonstrative embodiments, using the compensation function $G_n(k,m)$ may enable compensation of linear and/or non-linear phase distortion and/or frequency distortion in the echo estimation path 199.

In some demonstrative embodiments, determining the weights $w_{k,m}$ in the digital baseband domain, e.g., using digital baseband module 130, may enable compensation of a phase difference between the main Rx path and the Auxiliary Rx path, e.g., a phase difference between converter 165 and converter 154. For example, converters 165 and 154 may introduce different phase rotations, e.g., even if converters 165 and 154 are driven by a common Local Oscillator (LO).

In some demonstrative embodiments, weight calculator 138 may be configured to determine the weight $w_{k,m}$ based on he phase difference between the main Rx path and the auxiliary Rx path.

For example, weight calculator 138 may be configured to determine the weight $w_{k,m}$, e.g., as follows:

$$w_{k,m} = w_{k,m} + \mu \sum_n Re\{x_{k,m}^*(n)z(n)e^{-j\Delta_{phase}}\} \quad (18)$$

wherein $\Delta_{phase}$ denotes the phase difference between the phase of the main Rx path and the phase of the auxiliary Rx path. For example, the phase difference $\Delta_{phase}$ may be measured.

In some demonstrative embodiments, the digital baseband module 130 may be configured to determine weights $w_{k,m}$ in a manner, which may not require the auxiliary Rx path, e.g., as described below.

Figure 2:
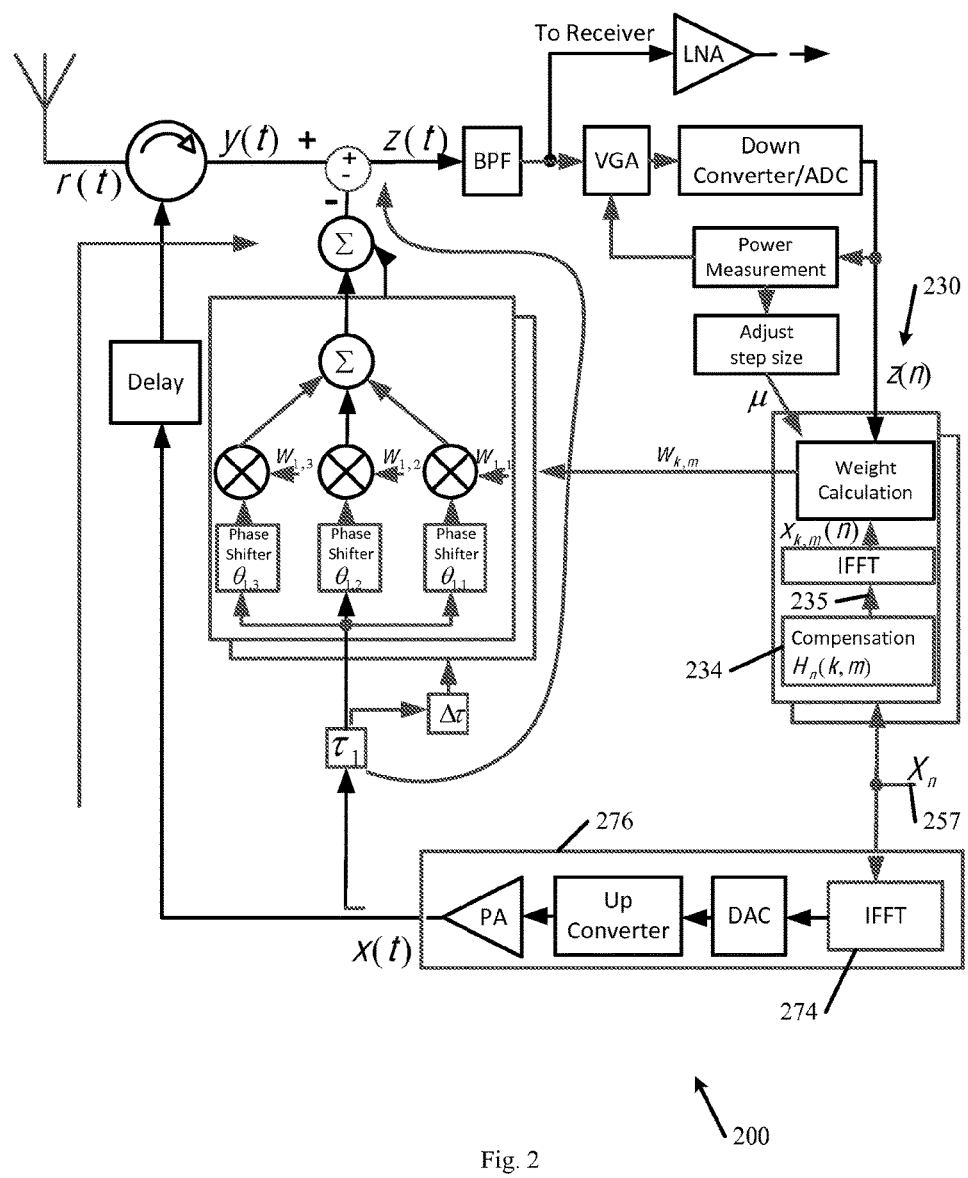
FIG. 2 is a schematic illustration of a transceiver, in accordance with some demonstrative embodiments.

Reference is made to FIG. 2, which schematically illustrates a transceiver 200, in accordance with some demonstrative embodiments. In some demonstrative embodiments, transceiver 200 may be implemented by device 102 (FIG. 2), e.g., instead of transceiver 110 (FIG. 1).

In some demonstrative embodiments, transceiver 200 may include a digital baseband module 230 to determine the weights $w_{k,m}$ based on a digital baseband frequency-domain signal 257. The digital baseband frequency-domain signal 257 may included the sub-carrier signals Xn of the transmitted signal X(n). For example, digital baseband module 230 may receive digital baseband frequency-domain signal 257, e.g., prior to signal 257 being transformed by an IFFT module 276 of a transmitter block 274 of transceiver 200.

In some demonstrative embodiments, digital baseband module 230 may include a compensator 234, which may be configured to generate a plurality of compensated sub-carrier signals 235 based on an frequency response of a path ("the modified echo estimation path") including a transmit path of transmitter 274, and a path of the m-th phase shifter in the k-th tap modulator of a RF echo cancellation module 220 of transceiver 200. For example, RF echo cancellation module 220 may have a functionality similar to the functionality of RF echo cancellation module 120 (FIG. 1).

In some demonstrative embodiments, compensator 134 may generate compensated sub-carrier signals Xn', by applying to the signal Xn a compensation function, denoted $H_n(k,m)$, e.g., as follows:

$$X_n' = X_n H_n(k,m) \qquad (19)$$

In some demonstrative embodiments, the compensation function $H_n(k,m)$ may include a frequency response of the path of the k-th tap and the m-th phase shifter including the transmitter path of transmitter 274 at the n-th subcarrier.

In some demonstrative embodiments, the value of the function $H_n(k,m)$ may be measured with respect to a particular combination of particular k-th tap and a particular m-th phase shifter, for example, by disconnecting the echo-cancellation path of transceiver 200, and disabling the modified echo estimation path except for the particular k-th tap and m-th phase shifter.

Figure 3:
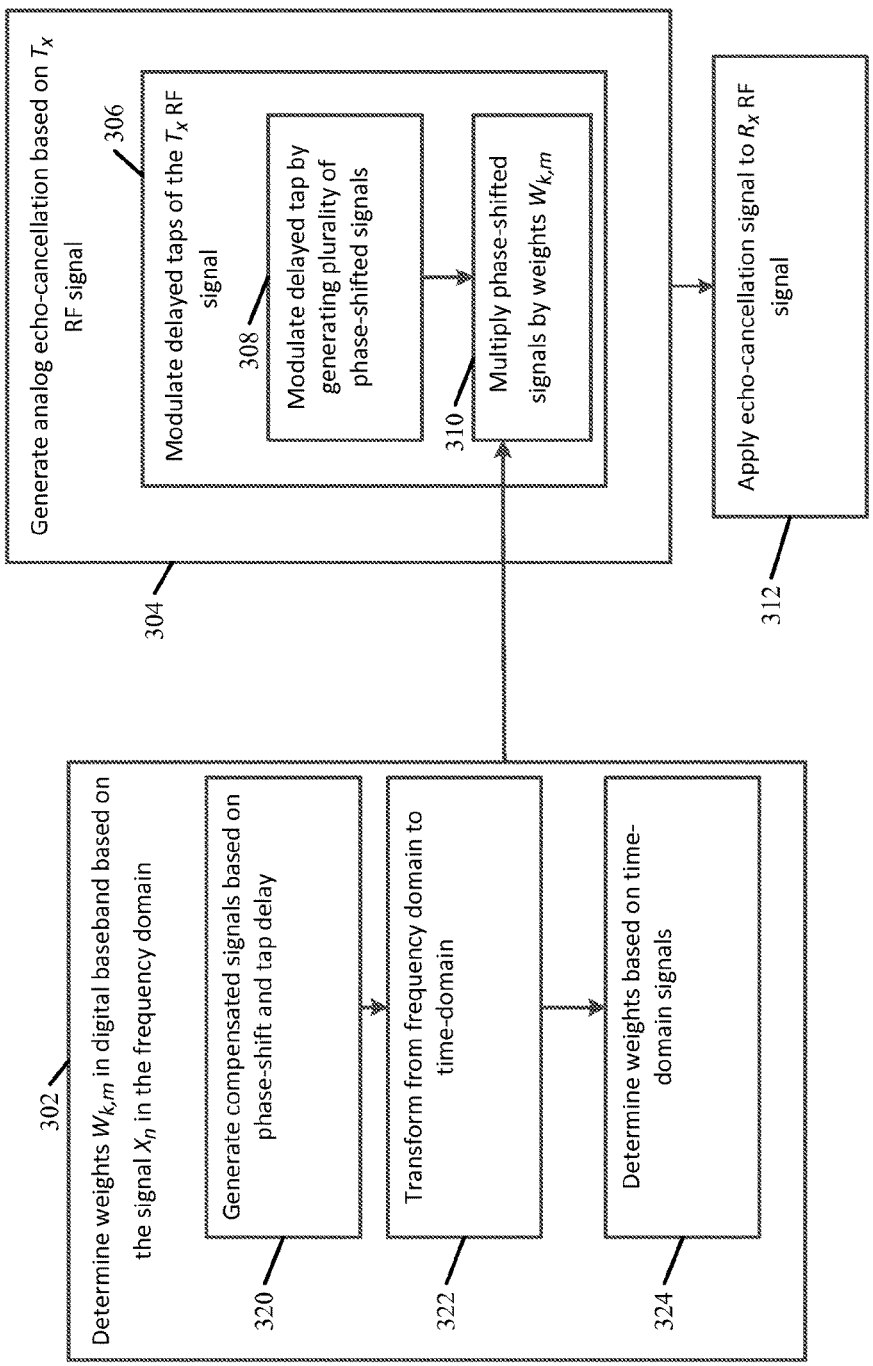
FIG. 3 is a schematic flow-chart illustration of a method of simultaneous transmit and receive wireless communication, in accordance with some demonstrative embodiments.

Reference is now made to FIG. 3, which schematically illustrates a method of simultaneous transmit and receive wireless communication, in accordance with some demonstrative embodiments. For example, one or more of the operations of the method of FIG. 3 may be performed by a wireless communication system, e.g., system 100 (FIG. 1); a wireless communication device, e.g., device 102 and/or 104 (FIG. 1); and/or transceiver, e.g., transceiver 110 (FIG. 1) or transceiver 200 (FIG. 2).

As indicated at block 302, the method may include determining a plurality of weights in a digital baseband based on a plurality of subcarriers of a digital frequency-domain signal corresponding to a transmitted RF signal. For example, digital baseband module 130 (FIG. 1) may determine the weights $w_{k,m}$ for example, according to Equation 16 or Equation 18, e.g., as described above.

As indicated at block 304, the method may include generating an analog echo cancellation signal based on the transmitted RF signal. For example, RF echo cancellation module 120 (FIG. 1) may generate the echo cancellation signal E(t) based on the transmitted signal x(t), e.g., as described above.

As indicated at block 306, generating an analog echo cancellation signal may include modulating a plurality of delayed taps of the transmitted RF signal. For example, the K tap modulators 122 (FIG. 1) may modulate the K taps of the transmitted signal x(t), e.g., as described above.

As indicated at block 308, modulating the plurality of delayed taps may include modulating a delayed tap of the plurality of delayed taps by generating a plurality of phase-shifted signals. For example, the M phase shifters 124 (FIG. 1) of the k-th tap modulator 122 (FIG. 1) may apply M respective phase-shifts to the k-th delayed tap, e.g., as described above.

As indicated at block 310, modulating the plurality of delayed taps may include multiplying the plurality of phase-shifted signals with the plurality of weights. For example, multipliers 126 (FIG. 1) may multiply the outputs of phase shifters 124 (FIG. 1) by the weights $w_{k,m}$, e.g., as described above.

As indicated at block 312, the method may include applying the analog echo cancellation signal to a received RF signal, For example, transceiver 110 (FIG. 1) may apply the echo cancellation signal E(t) to the received signal y(t), e.g., as described above.

As indicated at block 320, determining the plurality of weights in the digital baseband may include generating a plurality of compensated sub-carrier signals corresponding to a phase shifter of a delayed tap based on a phase shift of the phase shifter and a tap delay of the delayed tap. For example, compensator 134 may generate compensated sub-carrier signals 135 (FIG. 1) based on the phase shift $\theta_{k,m}$ and the tap delay $\tau_k$, e.g., as described above.

As indicated at block 322, determining the plurality of weights in the digital baseband may include transforming the plurality of compensated sub-carrier signals into a plurality of compensated time-domain signals. For example, IFFT module 136 (FIG. 1) may transform frequency-domain signals 135 (FIG. 1) into time domain signals 137 (FIG. 1), e.g., as described above.

As indicated at block 324, determining the plurality of weights in the digital baseband may include determining a weight corresponding to the phase shifter based on the compensated time-domain signals. For example, weight calculator 138 (FIG. 1) may calculate the weight $w_{k,m}$ based on signals 137 (FIG. 1), e.g., as described above.

Figure 4:
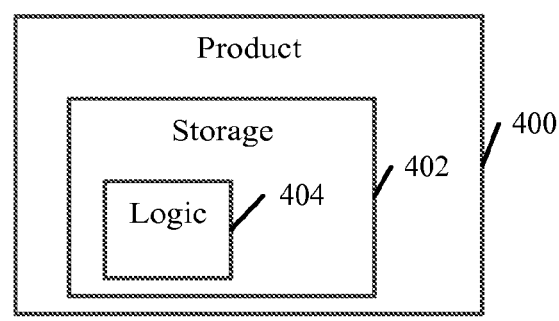
FIG. 4 is a schematic illustration of a product, in accordance with some demonstrative embodiments.

Reference is made to FIG. 4, which schematically illustrates a product of manufacture 400, in accordance with some demonstrative embodiments. Product 400 may include a non-transitory machine-readable storage medium 402 to store logic 404, which may be used, for example, to perform at least part of the functionality of device 102 (FIG. 1), device 104 (FIG. 1), transceiver 110 (FIG. 1), transceiver 200 (FIG. 2), digital baseband module 130 (FIG. 1), and/or digital baseband module 230 (FIG. 1), and/or to perform one or more operations of the method of FIG. 3. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a simultaneous transmit and receive (STR) transceiver comprising a receiver; a transmitter; a Radio Frequency (RF) echo cancellation module to generate an analog echo cancellation signal to be applied to a received RF signal via the receiver based on a transmitted RF signal via the transmitter, the RF echo cancellation module comprising a plurality of tap modulators to modulate a plurality of delayed taps of the transmitted RF signal, a tap modulator of the tap modulators including a plurality of phase shifters to generate a plurality of phase-shifted signals by applying a plurality of phase shifts to a delayed tap of the plurality of delayed taps, the tap modulator further including a plurality of multipliers to multiply the plurality of phase-shifted signals with a respective plurality of weights; and a digital baseband module to determine the plurality of weights based on a plurality of subcarriers of a digital frequency-domain signal corresponding to the transmitted RF signal.

Example 2 includes the subject matter of Example 1, and optionally, wherein the digital baseband module includes a compensator to generate a plurality of compensated sub-carrier signals corresponding to a phase shifter of the plurality of phase shifters based on a phase shift of the phase shifter and a tap delay of the delayed tap; a frequency-domain to time-domain transformer to transform the plurality of compensated sub-carrier signals into a plurality of compensated time-domain signals; and a weight calculator to determine a weight corresponding to the phase shifter based on the compensated time-domain signals.

Example 3 includes the subject matter of Example 2, and optionally, wherein the weight calculator is to determine the weight based on the received RF signal.

Example 4 includes the subject matter of Example 2 or 3, and optionally, comprising a receive path including a converter to convert the transmitted RF signal into a digital time-domain signal; and a time-domain to frequency-domain transformer to transform the digital time-domain signal into the digital frequency-domain signal.

Example 5 includes the subject matter of Example 4, and optionally, wherein the compensator is to generate the plurality of compensated sub-carrier signals based on a frequency response of the receive path.

Example 6 includes the subject matter of Example 4 or 5, and optionally, wherein the weight calculator is to determine the weight based on a phase difference between the receive path and a receiver path of the receiver.

Example 7 includes the subject matter of any one of Examples 2-6, and optionally, wherein the compensator is to generate the plurality of compensated sub-carrier signals based on a frequency response of a receiver path of the receiver, and a frequency response of a path of the tap modulator and phase shifter.

Example 8 includes the subject matter of any one of Examples 1-7, and optionally, wherein the tap modulator comprises a phase-shifting summer to sum the plurality of phase-shifted signals into a tap modulator output of the tap modulator, and wherein the RF echo cancellation module comprises a tap summer to generate the analog echo cancellation signal by summing tap modulator outputs of the plurality of tap modulators.

Example 9 includes the subject matter of any one of Examples 1-8, and optionally, wherein the plurality of phase shifts comprise fixed phase shifts.

Example 10 includes the subject matter of any one of Examples 1-9, and optionally, wherein the plurality of delayed taps are delayed by a plurality of fixed delays.

Example 11 includes a wireless communication device comprising at least one antenna; a receiver coupled to the antenna; a transmitter coupled to the antenna; a Radio Frequency (RF) echo cancellation module to generate an analog echo cancellation signal to be applied to a received RF signal via the receiver based on a transmitted RF signal via the transmitter, the RF echo cancellation module comprising a plurality of tap modulators to modulate a plurality of delayed taps of the transmitted RF signal, a tap modulator of the tap modulators including a plurality of phase shifters to generate a plurality of phase-shifted signals by applying a plurality of phase shifts to a delayed tap of the plurality of delayed taps, the tap modulator further including a plurality of multipliers to multiply the plurality of phase-shifted signals with a respective plurality of weights; a digital baseband module to determine the plurality of weights based on a plurality of subcarriers of a digital frequency-domain signal corresponding to the transmitted RF signal; a processor; and a memory.

Example 12 includes the subject matter of Example 11, and optionally, wherein the digital baseband module includes a compensator to generate a plurality of compensated sub-carrier signals corresponding to a phase shifter of the plurality of phase shifters based on a phase shift of the phase shifter and a tap delay of the delayed tap; a frequency-domain to time-domain transformer to transform the plurality of compensated sub-carrier signals into a plurality of compensated time-domain signals; and a weight calculator to determine a weight corresponding to the phase shifter based on the compensated time-domain signals.

Example 13 includes the subject matter of Example 12, and optionally, wherein the weight calculator is to determine the weight based on the received RF signal.

Example 14 includes the subject matter of Example 12 or 13, and optionally, comprising a receive path including a converter to convert the transmitted RF signal into a digital time-domain signal; and a time-domain to frequency-domain transformer to transform the digital time-domain signal into the digital frequency-domain signal.

Example 15 includes the subject matter of Example 14, and optionally, wherein the compensator is to generate the plurality of compensated sub-carrier signals based on a frequency response of the receive path.

Example 16 includes the subject matter of Example 14 or 15, and optionally, wherein the weight calculator is to determine the weight based on a phase difference between the receive path and a receiver path of the receiver.

Example 17 includes the subject matter of any one of Examples 12-16, and optionally, wherein the compensator is to generate the plurality of compensated sub-carrier signals based on a frequency response of a receiver path of the receiver, and a frequency response of a path of the tap modulator and phase shifter.

Example 18 includes the subject matter of any one of Examples 11-17, and optionally, wherein the tap modulator comprises a phase-shifting summer to sum the plurality of phase-shifted signals into a tap modulator output of the tap modulator, and wherein the RF echo cancellation module comprises a tap summer to generate the analog echo cancellation signal by summing tap modulator outputs of the plurality of tap modulators.

Example 19 includes the subject matter of any one of Examples 11-18, and optionally, wherein the plurality of phase shifts comprise fixed phase shifts.

Example 20 includes the subject matter of any one of Examples 11-19, and optionally, wherein the plurality of delayed taps are delayed by a plurality of fixed delays.

Example 21 includes a method of wireless communication, the method comprising determining a plurality of weights in a digital baseband based on a plurality of subcarriers of a digital frequency-domain signal corresponding to a transmitted Radio Frequency (RF) signal; generating an analog echo cancellation signal based on the transmitted RF signal, wherein generating the analog echo cancellation signal comprises modulating a plurality of delayed taps of the transmitted RF signal, wherein modulating a delayed tap of the plurality of delayed taps comprises generating a plurality of phase-shifted signals by applying a plurality of phase shifts to the delayed tap, and multiplying the plurality of phase-shifted signals with the plurality of weights; and applying the analog echo cancellation signal to a received RF signal.

Example 22 includes the subject matter of Example 21, and optionally, wherein determining a plurality of weights comprises generating a plurality of compensated sub-carrier signals corresponding to a phase shift of the plurality of phase shifts based on the phase shift and a tap delay of the delayed tap; transforming the plurality of compensated sub-carrier signals into a plurality of compensated time-domain signals; and determining a weight corresponding to the phase shift based on the compensated time-domain signals.

Example 23 includes the subject matter of Example 22, and optionally, comprising determining the weight based on the received RF signal.

Example 24 includes the subject matter of Example 22 or 23, and optionally, comprising converting, at a receive path, the transmitted RF signal into a digital time-domain signal; and transforming, at the receive path, the digital time-domain signal into the digital frequency-domain signal.

Example 25 includes the subject matter of Example 24, and optionally, comprising generating the plurality of compensated sub-carrier signals based on a frequency response of the receive path.

Example 26 includes the subject matter of Example 24 or 25, and optionally, comprising determining the weight based on a phase difference between the receive path and a receiver path through which the received RF signal is received.

Example 27 includes the subject matter of any one of Examples 22-26, and optionally, comprising generating the plurality of compensated sub-carrier signals based on a frequency response of a receiver path through which the received RF signal is received, and a frequency response of a path of generating the analog echo cancellation signal.

Example 28 includes the subject matter of any one of Examples 21-27, and optionally, wherein modulating the delayed tap comprises summing the plurality of phase-shifted signals into a tap modulation output, and wherein generating the analog echo cancellation signal comprises summing tap modulation outputs resulting from modulating the plurality of delayed taps.

Example 29 includes the subject matter of any one of Examples 21-28, and optionally, wherein the plurality of phase shifts comprise fixed phase shifts.

Example 30 includes the subject matter of any one of Examples 21-29, and optionally, wherein the plurality of delayed taps are delayed by a plurality of fixed delays.

Example 31 includes a product including a non-transitory storage medium having stored thereon instructions that, when executed by a machine, result in determining a plurality of weights in a digital baseband based on a plurality of subcarriers of a digital frequency-domain signal corresponding to a transmitted Radio Frequency (RF) signal; generating an analog echo cancellation signal based on the transmitted RF signal, wherein generating the analog echo cancellation signal comprises modulating a plurality of delayed taps of the transmitted RF signal, wherein modulating a delayed tap of the plurality of delayed taps comprises generating a plurality of phase-shifted signals by applying a plurality of phase shifts to the delayed tap, and multiplying the plurality of phase-shifted signals with the plurality of weights; and applying the analog echo cancellation signal to a received RF signal.

Example 32 includes the subject matter of Example 31, and optionally, wherein determining a plurality of weights comprises generating a plurality of compensated sub-carrier signals corresponding to a phase shift of the plurality of phase shifts based on the phase shift and a tap delay of the delayed tap; transforming the plurality of compensated sub-carrier signals into a plurality of compensated time-domain signals; and determining a weight corresponding to the phase shift based on the compensated time-domain signals.

Example 33 includes the subject matter of Example 32, and optionally, wherein the instructions result in determining the weight based on the received RF signal.

Example 34 includes the subject matter of Example 32 or 33, and optionally, wherein the instructions result in converting, at a receive path, the transmitted RF signal into a digital time-domain signal; and transforming, at the receive path, the digital time-domain signal into the digital frequency-domain signal.

Example 35 includes the subject matter of Example 34, and optionally, wherein the instructions result in generating the plurality of compensated sub-carrier signals based on a frequency response of the receive path.

Example 36 includes the subject matter of Example 34 or 35, and optionally, wherein the instructions result in determining the weight based on a phase difference between the receive path and a receiver path through which the received RF signal is received.

Example 37 includes the subject matter of any one of Examples 32-36, and optionally, wherein the instructions result in generating the plurality of compensated sub-carrier signals based on a frequency response of a receiver path through which the received RF signal is received, and a frequency response of a path of generating the analog echo cancellation signal.

Example 38 includes the subject matter of any one of Examples 31-37, and optionally, wherein modulating the delayed tap comprises summing the plurality of phase-shifted signals into a tap modulation output, and wherein generating the analog echo cancellation signal comprises summing tap modulation outputs resulting from modulating the plurality of delayed taps.

Example 39 includes the subject matter of any one of Examples 31-38, and optionally, wherein the plurality of phase shifts comprise fixed phase shifts.

Example 40 includes the subject matter of any one of Examples 31-39, and optionally, wherein the plurality of delayed taps are delayed by a plurality of fixed delays.

Example 41 includes an apparatus of wireless communication, the apparatus comprising means for determining a plurality of weights in a digital baseband based on a plurality of subcarriers of a digital frequency-domain signal corresponding to a transmitted Radio Frequency (RF) signal; means for generating an analog echo cancellation signal based on the transmitted RF signal, wherein generating the analog echo cancellation signal comprises modulating a plurality of delayed taps of the transmitted RF signal, wherein modulating a delayed tap of the plurality of delayed taps comprises generating a plurality of phase-shifted signals by applying a plurality of phase shifts to the delayed tap, and multiplying the plurality of phase-shifted signals with the plurality of weights; and means for applying the analog echo cancellation signal to a received RF signal.

Example 42 includes the subject matter of Example 41, and optionally, wherein determining a plurality of weights comprises generating a plurality of compensated sub-carrier signals corresponding to a phase shift of the plurality of phase shifts based on the phase shift and a tap delay of the delayed tap; transforming the plurality of compensated sub-carrier signals into a plurality of compensated time-domain signals; and determining a weight corresponding to the phase shift based on the compensated time-domain signals.

Example 43 includes the subject matter of Example 42, and optionally, comprising means for determining the weight based on the received RF signal.

Example 44 includes the subject matter of Example 42 or 43, and optionally, comprising means for converting, at a receive path, the transmitted RF signal into a digital time-domain signal; and means for transforming, at the receive path, the digital time-domain signal into the digital frequency-domain signal.

Example 45 includes the subject matter of Example 44, and optionally, comprising means for generating the plurality of compensated sub-carrier signals based on a frequency response of the receive path.

Example 46 includes the subject matter of Example 44 or 45, and optionally, comprising means for determining the weight based on a phase difference between the receive path and a receiver path through which the received RF signal is received.

Example 47 includes the subject matter of any one of Examples 42-46, and optionally, comprising means for generating the plurality of compensated sub-carrier signals based on a frequency response of a receiver path through which the received RF signal is received, and a frequency response of a path of generating the analog echo cancellation signal.

Example 48 includes the subject matter of any one of Examples 41-47, and optionally, wherein modulating the delayed tap comprises summing the plurality of phase-shifted signals into a tap modulation output, and wherein generating the analog echo cancellation signal comprises summing tap modulation outputs resulting from modulating the plurality of delayed taps.

Example 49 includes the subject matter of any one of Examples 41-48, and optionally, wherein the plurality of phase shifts comprise fixed phase shifts.

Example 50 includes the subject matter of any one of Examples 41-49, and optionally, wherein the plurality of delayed taps are delayed by a plurality of fixed delays.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A simultaneous transmit and receive (STR) transceiver comprising:
   a receiver;
   a transmitter;
   a Radio Frequency (RF) echo cancellation module to generate an analog echo cancellation signal to be applied to a received RF signal via said receiver based on a transmitted RF signal via said transmitter, said RF echo cancellation module comprising a plurality of tap modulators to modulate a plurality of delayed taps of said transmitted RF signal, a tap modulator of said tap modulators including a plurality of phase shifters to generate a plurality of phase-shifted signals by applying a plurality of phase shifts to a delayed tap of said plurality of delayed taps, the tap modulator further including a plurality of multipliers to multiply said plurality of phase-shifted signals with a respective plurality of weights; and
   a digital baseband module to determine said plurality of weights based on a plurality of subcarriers of a digital frequency-domain signal corresponding to said transmitted RF signal.

2. The transceiver of claim 1, wherein said digital baseband module includes:
   a compensator to generate a plurality of compensated sub-carrier signals corresponding to a phase shifter of said plurality of phase shifters based on a phase shift of said phase shifter and a tap delay of said delayed tap;
   a frequency-domain to time-domain transformer to transform said plurality of compensated sub-carrier signals into a plurality of compensated time-domain signals; and
   a weight calculator to determine a weight corresponding to said phase shifter based on the compensated time-domain signals.

3. The transceiver of claim 2, wherein said weight calculator is to determine said weight based on said received RF signal.

4. The transceiver of claim 2 comprising a receive path including:
   a converter to convert said transmitted RF signal into a digital time-domain signal; and
   a time-domain to frequency-domain transformer to transform said digital time-domain signal into said digital frequency-domain signal.

5. The transceiver of claim 4, wherein said compensator is to generate the plurality of compensated sub-carrier signals based on a frequency response of said receive path.

6. The transceiver of claim 4, wherein said weight calculator is to determine said weight based on a phase difference between said receive path and a receiver path of said receiver.

7. The transceiver of claim 2, wherein said compensator is to generate the plurality of compensated sub-carrier signals based on a frequency response of a receiver path of said receiver, and a frequency response of a path of the tap modulator and phase shifter.

8. The transceiver of claim 1, wherein said tap modulator comprises a phase-shifting summer to sum the plurality of phase-shifted signals into a tap modulator output of said tap modulator, and wherein said RF echo cancellation module comprises a tap summer to generate said analog echo cancellation signal by summing tap modulator outputs of said plurality of tap modulators.

9. The transceiver of claim 1, wherein said plurality of phase shifts comprise fixed phase shifts.

10. The transceiver of claim 1, wherein said plurality of delayed taps are delayed by a plurality of fixed delays.

11. A wireless communication device comprising:
at least one antenna;
a receiver coupled to said antenna;
a transmitter coupled to said antenna;
a Radio Frequency (RF) echo cancellation module to generate an analog echo cancellation signal to be applied to a received RF signal via said receiver based on a transmitted RF signal via said transmitter, said RF echo cancellation module comprising a plurality of tap modulators to modulate a plurality of delayed taps of said transmitted RF signal, a tap modulator of said tap modulators including a plurality of phase shifters to generate a plurality of phase-shifted signals by applying a plurality of phase shifts to a delayed tap of said plurality of delayed taps, the tap modulator further including a plurality of multipliers to multiply said plurality of phase-shifted signals with a respective plurality of weights;
a digital baseband module to determine said plurality of weights based on a plurality of subcarriers of a digital frequency-domain signal corresponding to said transmitted RF signal;
a processor; and
a memory.

12. The wireless communication device of claim 11, wherein said digital baseband module includes:
a compensator to generate a plurality of compensated sub-carrier signals corresponding to a phase shifter of said plurality of phase shifters based on a phase shift of said phase shifter and a tap delay of said delayed tap;
a frequency-domain to time-domain transformer to transform said plurality of compensated sub-carrier signals into a plurality of compensated time-domain signals; and
a weight calculator to determine a weight corresponding to said phase shifter based on the compensated time-domain signals.

13. The wireless communication device of claim 12, wherein said weight calculator is to determine said weight based on said received RF signal.

14. The wireless communication device of claim 12 comprising a receive path including:
a converter to convert said transmitted RF signal into a digital time-domain signal; and
a time-domain to frequency-domain transformer to transform said digital time-domain signal into said digital frequency-domain signal.

15. The wireless communication device of claim 14, wherein said compensator is to generate the plurality of compensated sub-carrier signals based on a frequency response of said receive path.

16. The wireless communication device of claim 14, wherein said weight calculator is to determine said weight based on a phase difference between said receive path and a receiver path of said receiver.

17. The wireless communication device of claim 12, wherein said compensator is to generate the plurality of compensated sub-carrier signals based on a frequency response of a receiver path of said receiver, and a frequency response of a path of the tap modulator and phase shifter.

18. A method of wireless communication, the method comprising:
determining a plurality of weights in a digital baseband based on a plurality of subcarriers of a digital frequency-domain signal corresponding to a transmitted Radio Frequency (RF) signal;
generating an analog echo cancellation signal based on said transmitted RF signal, wherein generating said analog echo cancellation signal comprises:
modulating a plurality of delayed taps of said transmitted RF signal, wherein modulating a delayed tap of said plurality of delayed taps comprises generating a plurality of phase-shifted signals by applying a plurality of phase shifts to said delayed tap, and multiplying said plurality of phase-shifted signals with said plurality of weights; and
applying the analog echo cancellation signal to a received RF signal.

19. The method of claim 18, wherein determining a plurality of weights comprises:
generating a plurality of compensated sub-carrier signals corresponding to a phase shift of said plurality of phase shifts based on the phase shift and a tap delay of said delayed tap;
transforming said plurality of compensated sub-carrier signals into a plurality of compensated time-domain signals; and
determining a weight corresponding to said phase shift based on the compensated time-domain signals.

20. The method of claim 19 comprising:
converting, at a receive path, said transmitted RF signal into a digital time-domain signal; and
transforming, at said receive path, said digital time-domain signal into said digital frequency-domain signal.

21. The method of claim 20 comprising generating the plurality of compensated sub-carrier signals based on a frequency response of said receive path.

22. A product including a non-transitory storage medium having stored thereon instructions that, when executed by a machine, result in:
determining a plurality of weights in a digital baseband based on a plurality of subcarriers of a digital frequency-domain signal corresponding to a transmitted Radio Frequency (RF) signal;
generating an analog echo cancellation signal based on said transmitted RF signal, wherein generating said analog echo cancellation signal comprises:
modulating a plurality of delayed taps of said transmitted RF signal, wherein modulating a delayed tap of said plurality of delayed taps comprises generating a plurality of phase-shifted signals by applying a plurality of phase shifts to said delayed tap, and multiplying said plurality of phase-shifted signals with said plurality of weights; and applying the analog echo cancellation signal to a received RF signal.

23. The product of claim 22, wherein determining a plurality of weights comprises:

generating a plurality of compensated sub-carrier signals corresponding to a phase shift of said plurality of phase shifts based on the phase shift and a tap delay of said delayed tap;

transforming said plurality of compensated sub-carrier signals into a plurality of compensated time-domain signals; and determining a weight corresponding to said phase shift based on the compensated time-domain signals.

24. The product of claim 23, wherein said instructions result in:

converting, at a receive path, said transmitted RF signal into a digital time-domain signal; and transforming, at said receive path, said digital time-domain signal into said digital frequency-domain signal.

\* \* \* \* \*